(12) United States Patent
Thomson et al.

(10) Patent No.: US 8,812,430 B1
(45) Date of Patent: Aug. 19, 2014

(54) DETERMINING A CONFIDENCE OF A MEASUREMENT SIGNATURE SCORE

(75) Inventors: Ty Matthew Thomson, Arlington, MA (US); Dexter Roydon Pratt, Reading, MA (US); David Drubin, Boston, MA (US)

(73) Assignee: Selventa, Inc., Cambridge, MA (US)

( * ) Notice: Subject to any disclaimer, the term of this patent is extended or adjusted under 35 U.S.C. 154(b) by 0 days.

(21) Appl. No.: 13/589,715

(22) Filed: Aug. 20, 2012

Related U.S. Application Data

(60) Provisional application No. 61/525,334, filed on Aug. 19, 2011.

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search
USPC .......................................................... 706/52
See application file for complete search history.

(56) References Cited

U.S. PATENT DOCUMENTS 8,417,661 B2 * 4/2013 Thomson et al. ............... 706/52

* cited by examiner

*Primary Examiner* — Michael B Holmes
(74) *Attorney, Agent, or Firm* — David H. Judson

(57) ABSTRACT

To directly compare two or more network perturbation amplitude scores and identify whether the difference between them is meaningful, an Uncertainty (confidence interval) for each of the scores is computed. According to this disclosure, experimental replicates of the measurements are used to compute the score Uncertainty, based on an assumption that variability between measurement replicates represents a largest source of error in the score. Preferably, at least three (3) experimental replicates for both treated and control conditions are used to compute Uncertainty.

7 Claims, 2 Drawing Sheets

DETERMINING A CONFIDENCE OF A MEASUREMENT SIGNATURE SCORE

This application is based on and claims priority to Ser. No. 61/525,334, filed Aug. 19, 2012.

RELATED APPLICATION

This application also is related to Ser. No. 13/149,022, filed May 31, 2010, now U.S. Publication No. 20120030162, titled "Method for quantifying amplitude of a response of a biological network."

TECHNICAL FIELD

This disclosure relates generally to methods and techniques for characterizing the response of biological networks.

BACKGROUND OF THE RELATED ART

Acquisition of large-scale data sets representing a variety of data modalities has become a crucial aspect of the characterization of experimental systems. Such a strategy affords a broad capture of biological information in a short time and with a relative small investment of effort. Rich datasets are collected in hopes that valuable biological insights might be gained. The amount of collected information, however, can be overwhelming, making interpretation of the data difficult, and subsequent detailed biological understanding elusive.

Researchers have developed several strategies to address the management of large-scale data sets, and these strategies offer some ability to interpret the data and develop biological insight. Many of these solutions are based on measurement enrichment. For example, Gene Set Enrichment Analysis determines whether members of a gene set tend to occur toward a top (or bottom) of a list, in which case the gene set is correlated with a phenotypic class distinction. Enrichment can also be incorporated with pathway analysis where, for example, specific measurements are associated with elements of a particular biological pathway. In addition to visually connecting measurements in this way, enrichment scores can be generated using a pathway to define the set of genes. Rather than identifying the upstream pathways that lead to the data, many of these enrichment-based solutions interpret the data from a "consequence" point of view, assessing the functional impact of the changes themselves. This approach, however, requires certain assumptions about the data and its impact, such as assuming mRNA expression is directly correlated to the activity of the encoded protein. Indeed, the correlation of mRNA to encoded protein abundance is variable. Focusing on strictly consequential perspectives also fails to capture a major facet of the data that can be harnessed from an upstream "causal" perspective. Additionally, from a use perspective, the output of many of these existing data interpretation strategies is a measure of statistical enrichment, ultimately yielding a Boolean decision about pathway enrichment/activation rather than a measure of activation intensity.

Alternative strategies have been described that focus on uncovering a characteristic "signature" of measurements that results from one or more perturbations to a biological process, and subsequently scoring the presence of that signature in additional data sets as a measure of specific activity of that process. Most previous work of this type involves identifying and scoring signatures that are correlated with a disease phenotype. These phenotype-derived signatures provide significant classification power, but the lack of a mechanistic or causal relationship between a single specific perturbation and the signature means that the signature may represent multiple distinct unknown perturbations that lead to the same disease phenotype. A number of studies, however, have focused instead on measuring causal signatures based on very specific upstream perturbations either performed directly in the system of interest, or from closely-related published data. Based on the simple, yet powerful, premise that modulation of cellular pathways and the components therein are associated with distinct signatures in measured node entities, causally-derived signatures enable the "cause" of the signature to be identified with high specificity from the measured "effect." These studies have demonstrated the great potential of applying a causal pathway scoring strategy to clinical problems, for example, by providing prognosis predictions in gastric cancer patients and indications of specific drug efficacy.

Given the vast potential of the information contained within large-scale data sets and the increasing ease at obtaining this data, new ways of mining understanding from these data sets have begun to be developed. Thus, for example, U.S. Publication No. 20120030162, which is commonly-owned, describes a method by which known techniques for causal pathway analysis of large data sets are extended to provide for a measure of intensity, which facilitates the comparison of biological states based on degree or amplitude of perturbation rather than comparison of likelihood of perturbation based on enrichment. According to that application, one or more measurement signatures are derived (e.g., from a knowledge base of casual biological facts), where a signature is a collection of measured node entities and their expected directions of change with respect to a reference node. The knowledge base may be a directed network of experimentally-observed casual relationships among biological entities and processes, and a reference node represents a potential perturbation to a biological entity or process (i.e., an entity that is hypothetically perturbed). A "degree of activation" of a signature is then assessed by scoring one or more "differential" data sets against the signature to compute an amplitude score, sometimes referred to as the "network perturbation amplitude" (NPA) metric. A "differential" data set is a data set having first and second conditions, e.g., a "treated" versus a "control" condition. In one embodiment, the amplitude score quantifies fold changes of measurements in the signature. A fold change is a number describing how much a quantity changes going from an initial to a final value.

While the above-described techniques provide significant advantages, it is desired to assess the computed NPA score's Uncertainty across specific experimental conditions to provide a confidence measure for the score. This disclosure describes such a solution.

BRIEF SUMMARY

To directly compare two or more NPA scores and identify whether the difference between them is meaningful, there must be some understanding of an Uncertainty (confidence interval) for each of the NPA scores. According to this disclosure, experimental replicates of the measurements are used to compute the score Uncertainty, based on an assumption that variability between measurement replicates represents a largest source of error in the score. Preferably, at least three (3) experimental replicates for both treated and control conditions are used to compute Uncertainty.

In particular, in one embodiment, to compute Uncertainty, replicates for treated and control experimental conditions are resampled. Preferably, to accurately compute the Uncertainty measure, at least three (3) replicates are used for both conditions. The replicates may be resampled for the two experimental conditions, drawing a same number of samples as there are replicates. Thus, for three (3) replicates, there are ten (10) unique combinations of replicates, namely: ({1,1,1}, {1,1,2}, {1,1,3}, {1,2,2}, {1,2,3}, {1,3,3}, {2,2,2}, {2,2,3}, {2,3,3}, and {3,3,3}). Given a minimum of three (3) replicates for each control and treated sample, there are at least one hundred (100) (10×10) unique combinations of replicates in each treated versus control contrast, and at least 100 replicate-sampled scores from which to compute each confidence.

In particular, an amplitude score for each resampled set of replicates is then computed. The distribution of these scores is representative of the variability that one might expect from one experiment to another, where each experiment involves the same number of replicates as the original experiment. This distribution of scores is then used to directly identify a confidence interval. For example, to determine the 95% confidence interval for an amplitude score, the NPA scores that correspond to the $2.5^{th}$ and $97.5^{th}$ percentiles from the distribution are computed. These scores are the lower and upper bounds on the 95% confidence interval.

Selection of the same replicate more than once during replicate resampling increases a fold-change p-value. Thus, although resampling may provide an accurate estimate for experiment-to-experiment variation in mean measurements, it does not provide an accurate estimate for the variation in the fold-change p-values. Therefore, preferably the p-values of the fold-changes for the original set of replicates are used when computing NPA scores for methods that depend on the p-value.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
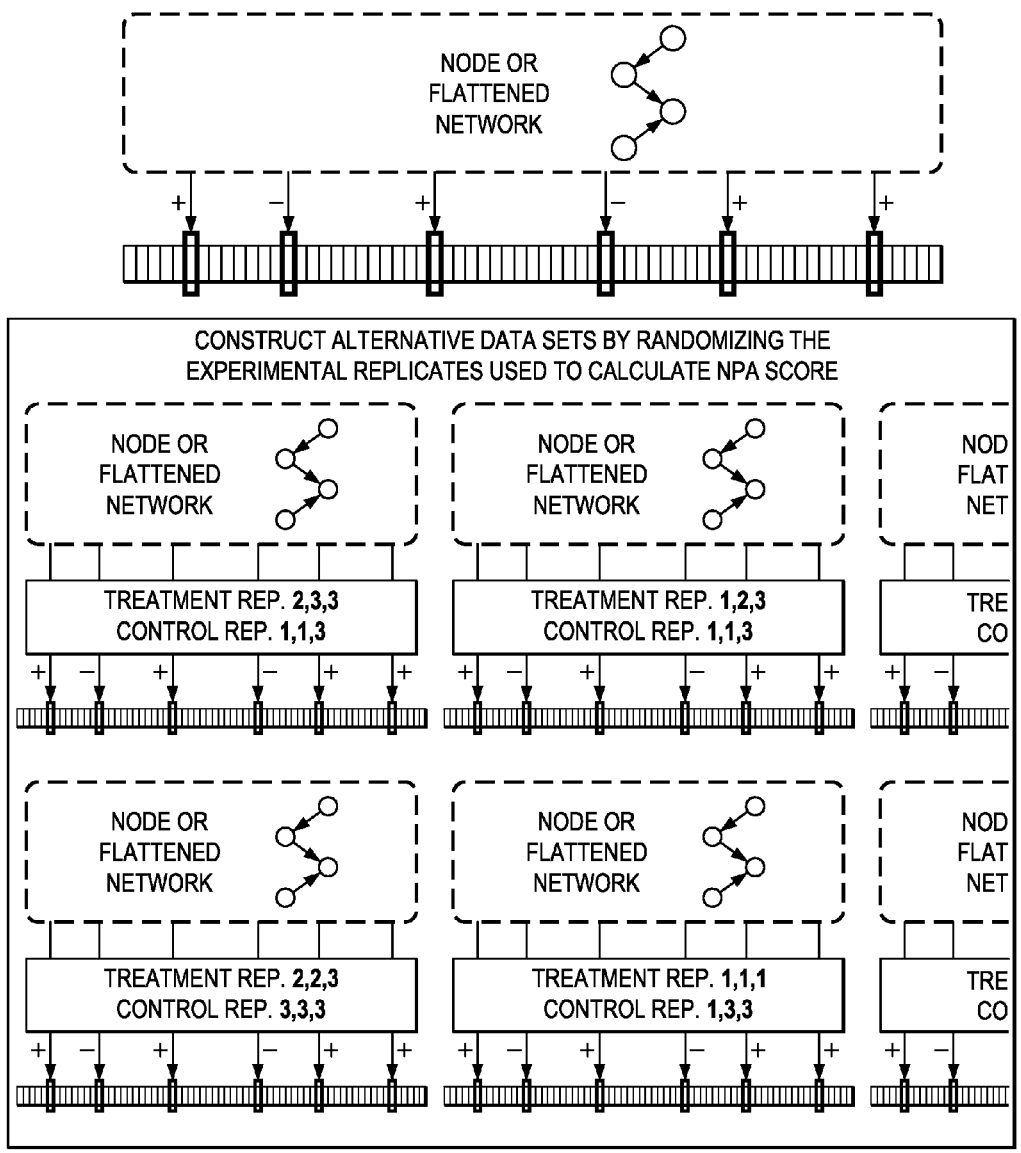
FIG. 1 illustrates a technique for constructing alternative data sets by randomizing experimental replicates used to calculate an NPA score.

The techniques herein, in one embodiment, take advantage of known systems and methods for assembling and mining life science data. In particular, it is known to manage and evaluate life science data using a large-scale, specialized, literature-derived knowledgebase of causal biological facts, sometimes referred to as a Knowledge Assembly Model (KAM). A system, method and apparatus of this type are described in commonly-owned U.S. Pat. No. 7,865,534, and U.S. Publication No. 2005/0165594, the disclosures of which are incorporated herein by reference. Familiarity with these known techniques is presumed. In addition to signatures derived from a casual knowledge base, there are other known techniques to derive the signature. Thus, in general, a signature is "received" from a source, which source may (but is not required to) be a casual knowledge base.

As described in U.S. Publication No. 20120030162, the disclosure of which is hereby incorporated by reference, it is known to extend these assembly and mining techniques to provide an "intensity" measure to provide for a high resolution comparison of biological states. As described in that application, there are several types of intensity measures that may be implemented, including, but not limited to, Strength, and Measured Abundance Signal Score (MASS).

As used herein, the following terms have the following definitions:

A "knowledge base" is a directed network, preferably of experimentally-observed casual relationships among biological entities and processes;

A "node" is a measurable entity or process;

A "measurement node" is a measured entity or process;

A "reference node" represents a potential perturbation to a node;

A "signature" is a collection of measurable node entities and their expected directions of change with respect to a reference node;

A "differential data set" is a data set that has data associated with a first condition, and data associated with a second condition distinct from the first condition; and A "fold change" is a number describing how much a quantity changes going from an initial to a final value, and is specifically computed by dividing the final value by the initial value.

A "quantile" is one of a series of points taken at regular intervals from a cumulative distribution function of a random variable.

As described in U.S. Publication No. 20120030162, one or more measurement signatures can be derived (e.g., from a knowledge base of casual biological facts), where a signature is a collection of measured node entities and their expected directions of change with respect to a reference node. Where a knowledge base is used to derive the signatures, preferably the knowledge base is a directed network of experimentally-observed casual relationships among biological entities and processes, and a reference node represents a potential perturbation. According to the teachings in U.S. Publication No. 20120030162, a "degree of activation" (referred to as "Strength" or "Measured Abundance Signal Score" in particular embodiments) of a signature is then assessed by scoring one or more "differential" data sets against the signature. The result of this computation is an amplitude score, measure or metric. A "differential" data set is a data set having first and second conditions, e.g., a "treated" versus "control" condition, a disease versus normal condition, a disease condition versus a different disease condition, a disease treated with a first drug versus the same disease treated with a second drug, a "responder" versus a "non-responder," a patient population versus a different patient population, pre- and post-drug treatment, pre- and post-development of a disease, pre- and post-remission of a disease, and so forth. The above examples are not intended to be limiting.

In one embodiment as described in the above-identified publication, a signature is defined as a set of measurement node entities (for example, mRNAs) and their expected direction of change (whether they are increased or decreased) in response to a perturbation. An expected direction of change typically is a fixed value, such as +1, representing an increase, and −1, representing a decrease, although this is not a limitation. One or more scoring algorithms are then used to assess the "degree of activation" of each measurement signature. In general, the quantification approach herein (i.e., the "degree of activation" measures) validates the use of a broad, literature-derived knowledge base to score various aspects of biology that can be defined as very specific mechanisms (such as an individual protein activity) that are directly proximal to the data, or as a larger network of interest that is composed of a collection of individual mechanisms.

As a shorthand reference, but not by way of limitation, the "degree of activation" computed as described in U.S. Publication 20120030162 is sometimes referred to as a "network perturbation amplitude" or "NPA." As noted above, the disclosure in that publication describes several "types" of the degree of activation measure associated with a signature. The first of these types is a "strength" measure, which is a weighted average of adjusted log-fold changes of measured node entities in the signature, where the adjustment applied to the log-fold changes is based on their expected direction of change. As used herein, log refers to log 2 or log 10. Thus, the "strength" metric quantifies fold-changes of measurements in the signature.

The following is a representative example of a "strength-based" amplitude score of this type:

$$\text{Strength}(f) = \frac{\sum_i (1 - pval_i)^f \times \text{direction}_i \times \log_2(FC_i)}{\sum_i (1 - pval_i)^f}$$

In this example, direction, represents the expected direction of change according to the signature (e.g., +1, representing an increase, and −1, representing a decrease) of the $i^{th}$ measured node entity in the signature, $FC_i$ represents the measured fold-change of the $i^{th}$ measured node entity, $pval_i$ represents a p-value for $FC_i$, f is a constant that controls the degree to which the influence each fold change is weighted according to its p-value, N is a number of measured node entities in the signature, and the sum over all i is the sum over all measured node entities in the signature. This "strength at f" (or p-value adjusted Strength) measure thus is the weighted geometric mean of the ratios of the measurement where the weighting factors are derived from the p-values, and the ratios are adjusted for their predicted direction of change.

An alternative "unweighted" Strength measure with weight=1 (equivalently, f=0) is derived according to the following function:

$$\text{Strength} = \frac{\sum_i \text{direction}_i \times \log_2(FC_i)}{N}$$

In particular, "unweighted" Strength is the geometric mean of the ratios of the measurements of quantities predicted by to change according to a signature, adjusted for the direction of the prediction.

Strength assumes that the ratio of change of each measurement (e.g., a measured gene) is the basis of the calculation for the metric. Thus, two measurements have the same impact on the metric if they change by the same ratio, regardless of the absolute value of their measured values. In certain circumstances, however, the impact of a change in a measured gene may be more likely to depend on the ratio of change, because the transcripts of critical genes in control systems such as transcription factors may be present in small numbers but have large effect. However, NPA metrics are meant to assess the magnitude of perturbation of the reference node of a signature, rather than the impact of changes elicited by the signature. In attempting to measure the amplitude of a process, the quantity of the effects actually observed may be more important than what those changes might cause. Thus, as an alternative to the Strength measures described above, the degree of activation measure may be based on Measured Abundance Signal Score (MASS). As also described in U.S. Publication No. 20120030162, a MASS is an NPA based on absolute changes of nodes that represent some measurable physical quantities. In one variant, this approach is applicable to any measurement technique that quantifies a physical measurable in a manner such that measurements are proportional to absolute quantities across all measurement nodes (i.e., the measurements for different nodes can be compared directly). Thus, as one example of this latter approach, the metric is a count that represents a change in absolute node quantities in a direction supporting an increase in a process described by the signature, divided by an average of a total absolute quantity of the nodes. This approach to computing the degree of activation measure thus quantifies the absolute change in the nodes (corrected for the expected direction of change of each node in the signature) compared to the total quantity of the nodes.

Uncertainty

To directly compare two or more NPA scores and identify whether the difference between them is meaningful, there must be some understanding of an Uncertainty (confidence interval) for each of the NPA scores. According to this disclosure, experimental replicates of the measurements are used to compute the score Uncertainty, based on an assumption that variability between measurement replicates represents a largest source of error in the score. Preferably, at least three (3) experimental replicates for both treated and control conditions are used to compute Uncertainty.

In particular, in one embodiment, to compute Uncertainty, replicates for treated and control experimental conditions are resampled. Preferably, to accurately compute the Uncertainty measure, at least three replicates are used for both conditions. As illustrated in FIG. 1, the replicates are independently resampled for the two experimental conditions, drawing a same number of samples as there are replicates. Thus, for three (3) replicates, there are ten (10) unique combinations of replicates, namely: ({1,1,1}, {1,1,2}, {1,1,3}, {1,2,2}, {1,2,3}, {1,3,3}, {2,2,2}, {2,2,3}, {2,3,3}, and {3,3,3}). These alternative data sets are shown in FIG. 1. Given a minimum of three (3) replicates for each control and treated sample, there are at least one hundred (100) (10×10) unique combinations of replicates in each treated versus control contrast, and at least 100 replicate-sampled scores from which to compute each confidence.

Figure 2:
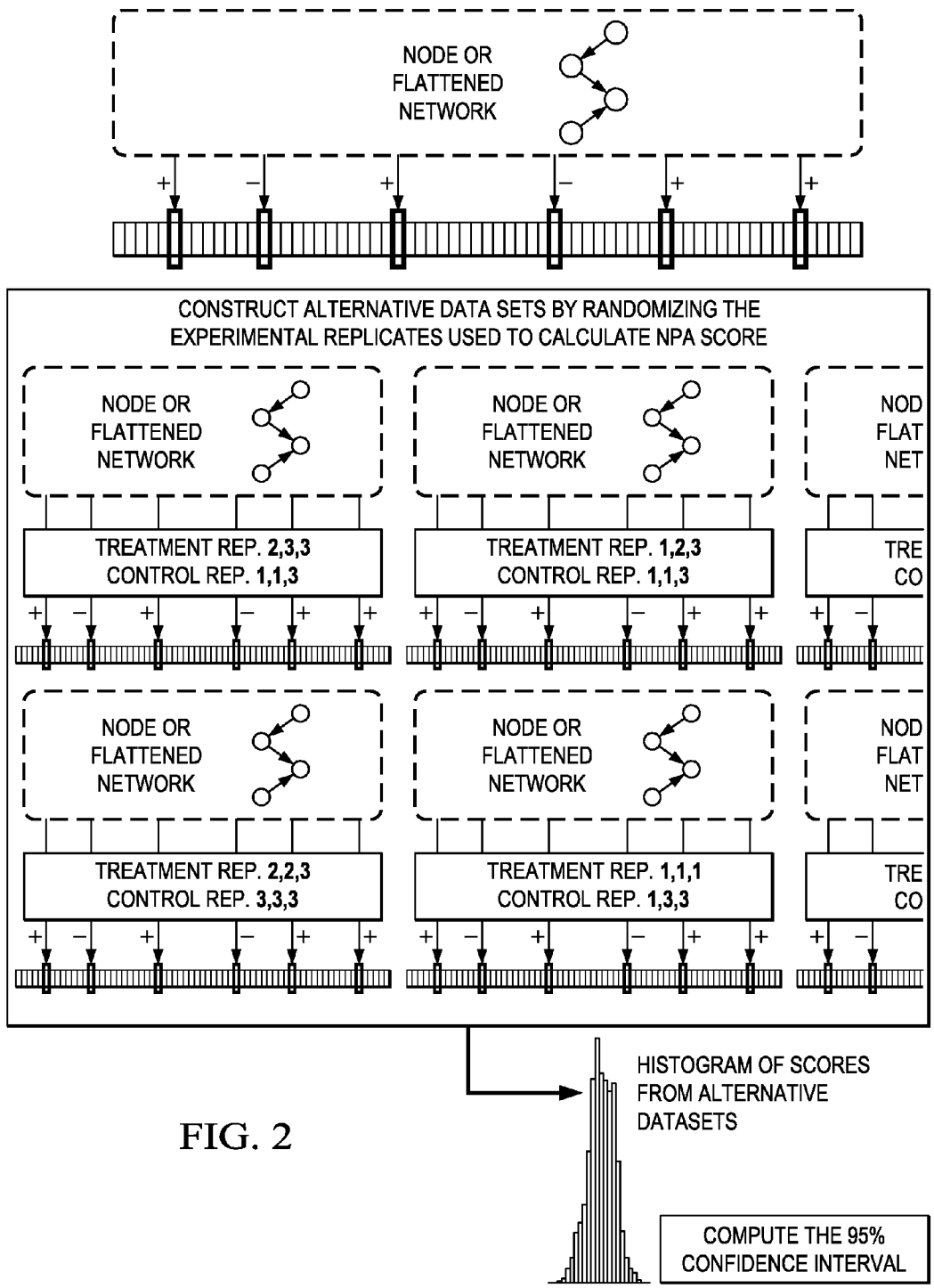
FIG. 2 illustrates a histogram of scores that are derived from the alternative data sets (from FIG. 1), and how these scores are used to compute Uncertainty according to this disclosure.

In particular, a score (NPA) for each resampled set of replicates is then computed. As seen in FIG. 2, the distribution of these scores is representative of the variability that one might expect from one experiment to another, where each experiment involves the same number of replicates as the original experiment. This distribution of scores is then used to directly identify a confidence interval. For example, to determine the 95% confidence interval for an amplitude score, the NPA scores that correspond to the $2.5^{th}$ and $97.5^{th}$ percentiles from the distribution are computed. These scores are the lower and upper bounds on the 95% confidence interval.

Selection of the same replicate more than once during replicate resampling increases the fold-change p-value. Thus, although resampling may provide an accurate estimate for experiment-to-experiment variation in mean measurements, it does not provide an accurate estimate for the variation in the fold-change p-values. Therefore, preferably the p-values of the fold-changes for the original set of replicates are used when computing NPA scores for methods that depend on the p-value.

The techniques described herein are implemented using computer-implemented enabling technologies such as described in commonly-owned, co-pending applications U.S. Publication No. 2005/00038608, No. 2005/0165594, No. 2005/0154535, and No. 2007/0225956. These patent applications, the disclosures of which are incorporated herein by reference, describe a casual-based systems biology modeling tool and methodology. In general, this approach provides a software-implemented method for hypothesizing a biological relationship in a biological system that uses a database comprising a multiplicity of nodes representative of biological elements, and relationship descriptors describing relationships between nodes, the nodes and relationship descriptors in the database comprising a collection of biological assertions from which one or more candidate biological assertions are chosen. After selecting a target node in the database for investigation, a perturbation is specified for the target node. In response, given nodes and relationship descriptors of the database that potentially affect or are affected by the target node are traversed. In response to data generated during the traversing step, candidate biological assertions can be identified for further analysis. These biological assertions, and the nodes described therein, comprise the signature of interest for the target node (i.e., the signature's reference node).

Aspects of this disclosure (such as the calculation of the Uncertainty metrics) may be practiced, typically in software, on one or more machines or computing devices. Generalizing, a machine or computing device (a "computing entity") typically comprises commodity hardware and software, storage (e.g., disks, disk arrays, and the like) and memory (RAM, ROM, and the like). The particular computing entities used in the system are not a limitation of the present invention. A given machine includes network interfaces and software to connect the machine to a network in the usual manner. The subject matter or features thereof may be implemented as a standalone product, or as a managed service using a set of machines, which are connected or connectable to one or more networks. More generally, the product or service is provided using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., AJAX technologies, Java applets or servlets, linkable libraries, native code, or the like, depending on platform), that provide the functionality of a given system or subsystem. A display may be used to provide an output of the Uncertainty metric. As described, the product or service (or any function thereof) may be implemented in a standalone server, or across a distributed set of machines, or in any a tablet or handheld computing device. Typically, a server or computing device connects to the publicly-routable Internet, an intranet, a private network, or any combination thereof, depending on the desired implementation environment.

Having described our invention, what is claimed is set forth in the following claim set.

The invention claimed is:

1. A method to enable assessment of a significance of a network perturbation amplitude (NPA) score with respect to a treated and control contrast, the method comprising:
   resampling experimental replicates for each of the treated and control conditions one or more times;
   for each resampling, computing an NPA score using a machine having a hardware element;
   plotting, as a distribution, the NPA scores computed from the resampled experimental replicates; and
   identifying a confidence interval for each contrast from the distribution.

2. The method as described in claim 1 wherein the resampling is carried out multiple times for each contrast.

3. The method as described in claim 2 wherein the resampling is carried out with replacement.

4. The method as described in claim 1 wherein the computing step uses p-values of fold-changes for the replicates.

5. The method as described in claim 1 wherein the NPA score is derived by the following sub-steps:
   receiving a signature that is a collection of measurable node entities and their expected directions of change with respect to a reference node; and
   assessing a degree of activation of the signature by scoring one or more data sets against the signature to compute the NPA score.

6. The method as described in claim 5 wherein the NPA score quantifies fold-changes of measurements in the signature.

7. The method as described in claim 6 wherein the NPA score is a weighted average of adjusted log-fold changes of measured node entities in the signature, where an adjustment applied to the log-fold changes is based on their expected direction of change.

* * * * *